US009723662B2

(12) United States Patent
Ye et al.

(10) Patent No.: US 9,723,662 B2
(45) Date of Patent: *Aug. 1, 2017

(54) POWER SOURCE MODULE FOR LED LAMP

(71) Applicant: JIAXING SUPER LIGHTING ELECTRIC APPLIANCE CO., LTD, Jiaxing (CN)

(72) Inventors: Qifeng Ye, Jiaxing (CN); Tao Jiang, Jiaxing (CN); Yueqiang Zhang, Jiaxing (CN); Zhong Chen, Jiaxing (CN)

(73) Assignee: Jiaxing Super Lighting Electric Appliance Co., Ltd., Xiuzhou Area, Jiaxing, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,068

(22) Filed: Sep. 7, 2016

(65) Prior Publication Data

US 2016/0381746 A1    Dec. 29, 2016

Related U.S. Application Data

(63) Continuation of application No. 14/699,138, filed on Apr. 29, 2015, now Pat. No. 9,480,109.

(30) Foreign Application Priority Data

Oct. 17, 2014 (CN) ...................... 2014 2 0602526 U

(51) Int. Cl.
*H05B 33/08* (2006.01)
*F21K 9/278* (2016.01)
(Continued)

(52) U.S. Cl.
CPC ........... *H05B 33/0812* (2013.01); *F21K 9/27* (2016.08); *F21K 9/278* (2016.08); *F21V 23/009* (2013.01);
(Continued)

(58) Field of Classification Search
CPC ............ H05B 33/0809; H05B 33/0815; H05B 33/0803; H05B 33/0812; H05B 33/0806;
(Continued)

(56) References Cited

U.S. PATENT DOCUMENTS 5,936,599 A    8/1999  Reymond
6,762,562 B2 *  7/2004  Leong ....................... F21K 9/00
                                                              315/51
(Continued)

FOREIGN PATENT DOCUMENTS

CN          200965185         10/2007
CN          101715265          5/2010
(Continued)

*Primary Examiner* — Vibol Tan
(74) *Attorney, Agent, or Firm* — Muir Patent Law, PLLC

(57) ABSTRACT

A power source module for an LED lamp includes a filament-simulating circuit electrically connected to a first bi-pin terminal and a second bi-pin terminal of the LED lamp, each of the first bi-pin terminal and the second bi-pin terminal configured to allow a current to flow from one pin to the other pin via the filament-simulating circuit during a pre-heat process executed by a ballast; a current limiting circuit electrically connected to the filament-simulating circuit configured to limit a current from the filament-simulating circuit; a first rectifier electrically connected to the current limiting circuit configured to rectify the current from the current limiting circuit; and a filter electrically connected between the first rectifier and at least one LED of the LED lamp configured to smooth the current from the first rectifier.

43 Claims, 3 Drawing Sheets

(51) Int. Cl.
*F21V 23/00* (2015.01)
*F21V 23/02* (2006.01)
*F21K 9/27* (2016.01)

(52) U.S. Cl.
CPC ....... *F21V 23/023* (2013.01); *H05B 33/0809* (2013.01); *H05B 33/0845* (2013.01); *Y02B 20/343* (2013.01); *Y02B 20/345* (2013.01)

(58) Field of Classification Search
CPC ............ H05B 33/0884; H05B 33/0887; H05B 33/089; H05B 37/02; Y02B 20/386; Y02B 20/40; Y02B 20/186; Y02B 20/342; Y02B 20/346; F21K 9/17
See application file for complete search history.

(56) References Cited

U.S. PATENT DOCUMENTS

| | | | |
|---|---|---|---|
| 6,853,151 B2 * | 2/2005 | Leong | H05B 33/0803 315/185 R |
| 7,067,992 B2 * | 6/2006 | Leong | F21K 9/00 315/291 |
| 7,380,961 B2 | 6/2008 | Moriyama | |
| 8,525,427 B2 | 9/2013 | Samoilenko et al. | |
| 8,648,542 B2 | 2/2014 | Kim et al. | |
| 8,729,809 B2 * | 5/2014 | Kit | H05B 33/0809 315/185 R |
| 8,796,943 B2 | 8/2014 | Miyamichi | |
| 8,870,415 B2 * | 10/2014 | Ivey | F21K 9/17 362/221 |
| 8,896,207 B2 * | 11/2014 | Thomas | H05B 33/0809 315/185 R |
| 9,210,744 B2 | 12/2015 | Del Carmen, Jr. et al. | |
| 9,445,463 B2 * | 9/2016 | Choi | H05B 33/0815 |
| 9,526,133 B2 * | 12/2016 | Tao | H05B 37/02 |
| 9,609,711 B2 * | 3/2017 | Jiang | H05B 33/0845 |
| 9,629,211 B2 * | 4/2017 | Xiong | H05B 33/0815 |
| 9,629,215 B2 * | 4/2017 | Xiong | H05B 33/0845 |
| 9,629,216 B2 * | 4/2017 | Jiang | H05B 33/0845 |
| 2007/0127242 A1 | 6/2007 | Allen et al. | |
| 2010/0096976 A1 | 4/2010 | Park | |
| 2010/0102729 A1 | 4/2010 | Katzir | |
| 2010/0181925 A1 | 7/2010 | Ivey et al. | |
| 2010/0220469 A1 | 9/2010 | Ivey et al. | |
| 2011/0057572 A1 | 3/2011 | Kit et al. | |
| 2011/0121756 A1 | 5/2011 | Thomas et al. | |
| 2011/0149563 A1 | 6/2011 | Hsia et al. | |
| 2011/0176297 A1 | 7/2011 | Hsia et al. | |
| 2011/0181190 A1 | 7/2011 | Lin et al. | |
| 2012/0181952 A1 | 7/2012 | Rooer | |
| 2012/0299501 A1 | 11/2012 | Kost et al. | |
| 2012/0300445 A1 | 11/2012 | Chu et al. | |
| 2012/0313540 A1 | 12/2012 | Lin | |
| 2013/0320869 A1 | 12/2013 | Jans | |
| 2014/0035463 A1 | 2/2014 | Miyamichi | |
| 2014/0239827 A1 | 8/2014 | Park | |
| 2014/0239834 A1 * | 8/2014 | Choi | H05B 33/0809 315/205 |
| 2014/0265900 A1 | 9/2014 | Sadwick et al. | |
| 2015/0077001 A1 | 3/2015 | Takahashi | |
| 2015/0173138 A1 | 6/2015 | Roberts | |
| 2015/0176770 A1 | 6/2015 | Wilcox et al. | |
| 2015/0351171 A1 | 12/2015 | Tao et al. | |
| 2016/0081147 A1 | 3/2016 | Guang | |
| 2016/0091147 A1 | 3/2016 | Jiang et al. | |
| 2016/0102813 A1 | 4/2016 | Ye et al. | |
| 2016/0198535 A1 | 7/2016 | Ye et al. | |
| 2016/0212809 A1 | 7/2016 | Xiong et al. | |
| 2016/0219658 A1 | 7/2016 | Xiong et al. | |
| 2016/0219666 A1 | 7/2016 | Xiong et al. | |
| 2016/0255694 A1 | 9/2016 | Jiang et al. | |
| 2016/0255699 A1 | 9/2016 | Ye et al. | |
| 2016/0270164 A1 | 9/2016 | Xiong et al. | |
| 2016/0270165 A1 | 9/2016 | Xiong et al. | |
| 2016/0270166 A1 | 9/2016 | Xiong et al. | |
| 2016/0270173 A1 | 9/2016 | Xiong | |
| 2016/0270184 A1 | 9/2016 | Xiong et al. | |
| 2016/0309550 A1 | 10/2016 | Xiong et al. | |
| 2016/0316533 A1 * | 10/2016 | Hsia | F21V 25/04 |
| 2016/0323948 A1 | 11/2016 | Xiong et al. | |
| 2016/0381760 A1 | 12/2016 | Xiong et al. | |

FOREIGN PATENT DOCUMENTS

| | | |
|---|---|---|
| CN | 102155642 | 8/2011 |
| CN | 102355780 | 2/2012 |
| CN | 102932997 | 2/2013 |
| CN | 104735873 | 6/2015 |
| EP | 2914065 | 9/2015 |
| GB | 2533683 | 6/2016 |
| WO | WO2012139691 | 10/2012 |

* cited by examiner

POWER SOURCE MODULE FOR LED LAMP

PRIORITY CLAIM

This application is a continuation application of U.S. application Ser. No. 14/699,138, filed Apr. 29, 2015, the contents of which are incorporated herein by reference in their entirety. The U.S. application Ser. No. 14/699,138 claims the benefit of the filing date of Chinese Patent Application No. 201420602526.2, filed Oct. 17, 2014, entitled "POWER SOURCE MODULE FOR LED LAMP," and the contents of which are hereby incorporated by reference in their entirety.

FIELD OF THE INVENTION

The present disclosure relates to a power source module for a light emitting diode (LED) lamp, and more particularly, the present disclosure relates to a power source module for enabling the LED lamp installed on the traditional fluorescent lamp base.

BACKGROUND

Fluorescent lamps have been used widely in the world for illumination. The traditional fluorescent lamp is detachably installed on a fluorescent lamp base to receive the power from the power source in the base to emit light. According to the principle of luminosity of the traditional fluorescent lamp, the fluorescent lamp base has to provide a starter and a ballast to drive the traditional fluorescent lamp. The starter is used for heating filaments in the fluorescent lamp and raising a voltage between the two terminals of the fluorescent lamp, so as to ignite the fluorescent lamp to light. The traditional fluorescent lamp has a negative incremental impedance characteristic, so that it needs the ballast to limit the amount of the current for preventing the fluorescent lamp from damage.

The traditional fluorescent lamp is filled with Argon, Neon, Krypton at low atmospheric pressure, and a bit of mercury vapor which is harmful. The traditional fluorescent lamp also has the disadvantages of high power consumption and high heat generation. Compared to the traditional fluorescent lamp, the LED lamp has the advantages of absence of mercury pollution, more power saving, and longer life. Therefore, the LED lamps are adopted more widely in the world recently to replace the traditional fluorescent lamps.

To replace the traditional fluorescent lamp by the LED lamp, the original circuit included in the fluorescent lamp base might need to be modified to adapt the LED lamp. There are two types of fluorescent lamp bases: one adopts an independent starter and an inductance as the ballast; the other adopts an electrical ballast including the starter therein. The inductance opposes the change in current and so the inductance ballast would attempt to keep the current of the LED lamp in a substantially fixed current. The starter and the electrical ballast generate a gaseous electric discharge in the fluorescent lamp by raising the voltage, and so it would cause the LED lamp to burn away. For the first type of the fluorescent lamp base, the LED lamp can be installed on the base directly and operates normally by taking the starter away and retaining the inductance ballast, and the starter in this type of fluorescent lamp base can be easily taken away by the user. On the contrary, the electrical ballast needs to be removed away by the user, and further the circuit in the fluorescent lamp base must be modified correspondingly for the LED lamp.

The modification to the electric ballast type fluorescent lamp base is complicated to the user, even to the professional. Also, it needs manpower and material resources to make the modification. The inconvenience of the modification to the electric ballast keeps the users from replacing the traditional fluorescent lamp with the LED lamp.

Accordingly, the present disclosure and its embodiments are herein provided to address the above issues.

SUMMARY OF THE INVENTION

One object of the present disclosure is to provide a power source module for an LED lamp for use in a fluorescent lamp base including a ballast.

According to an embodiment of the invention, the power source module includes a filament-simulating circuit, a first rectifier, and a filter. The filament-simulating circuit is electrically connected to a first and a second bi-pin terminals of the LED lamp. Each of the first and the second bi-pin terminals has a current flowing from one pin to the other pin via the filament-simulating circuit during a pre-heat process executed by the ballast of the fluorescent lamp base. The first rectifier is electrically connected to the first bi-pin terminal for rectifying the current from the first bi-pin terminal. The filter is electrically connected between the first rectifier and at least one LED of the LED lamp for smoothing the current from the first rectifier and then outputting the current to the LED.

The power source module prevents the LED lamp from burning away by a high voltage, so as to enable the LED lamp installed on the traditional fluorescent lamp base to operate normally without modifying the circuit in the base.

Another object of the present invention is to provide a power source module for an LED lamp having a current limiting circuit to protect the LED lamp.

According to another embodiment, the power source module includes a current limiting circuit, a first rectifier, and a filter. The current limiting circuit is electrically connected to a first terminal of the LED lamp for limiting a circuit from the terminal. The first rectifier is electrically connected to the current limiting circuit, and the filter is electrically connected to the first rectifier, so as to rectifying and smoothing the current.

Another object of the present invention is to provide a power source module for an LED lamp having a discharge circuit to prevent the LED lamp from flicker when turning off the LED lamp.

According to another embodiment, the power source module includes a rectifier, a filter, and a discharge circuit. The rectifier electrically connected to the terminals of the LED lamp for receiving a current, the filter is electrically connected between the rectifier and at least one LED of the LED lamp to storing energy for smoothing the current, and the discharging circuit is electrically connected to the filter in parallel for discharging the energy in the filter.

On the advantages and the spirit of the invention, it can be understood further by the following invention descriptions and attached drawings.

DETAILED DESCRIPTION

Figure 1:
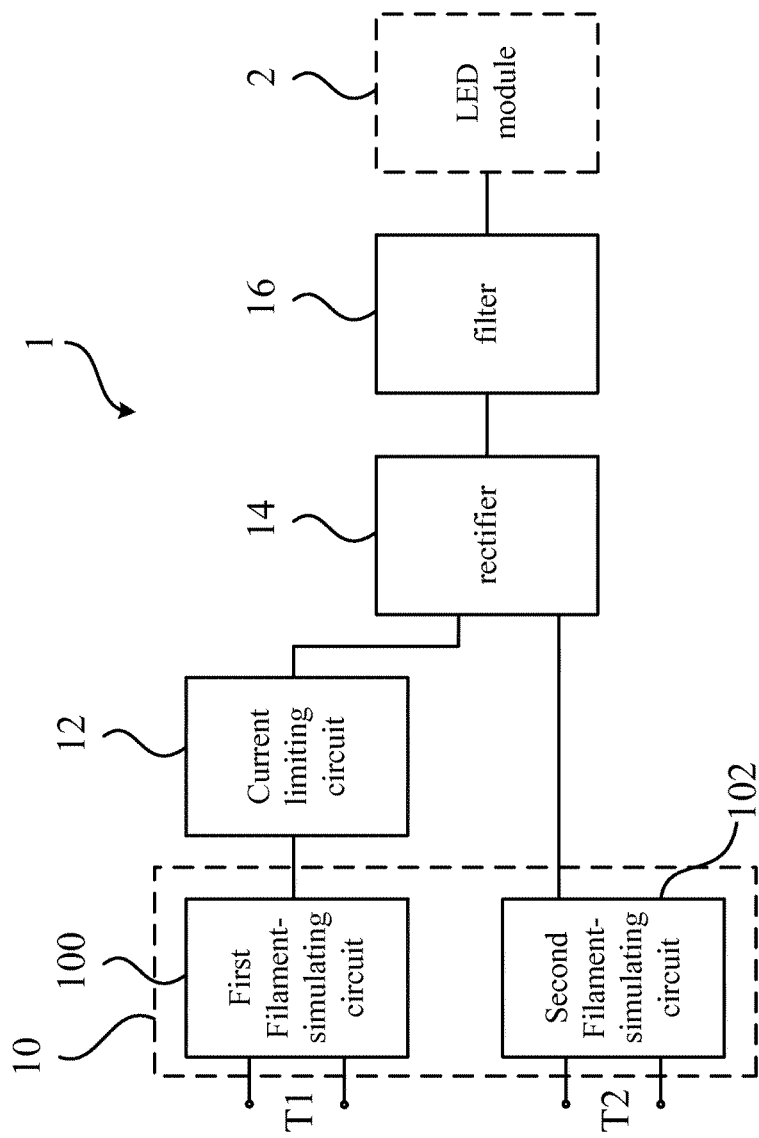
FIG. 1 is a function block diagram illustrating a power source module for an LED lamp according to an embodiment of the invention.

Please refer to FIG. 1. FIG. 1 is a function block diagram illustrating a power source module 1 for an LED lamp according to an embodiment of the invention. The power source module 1 may be configured inside a casing of the LED lamp to connect an LED module 2 of the LED lamp to terminals of the LED lamp. The LED module includes at least one LED.

As shown in FIG. 1, the power source module 1 includes a filament-simulating unit 10, a current limiting circuit 12, a rectifier 14, and a filter 16. The filament-simulating unit 10 is electrically connected to the terminals of the LED lamp. The terminals of the LED lamp includes a first bi-pin terminal T1 and a second bi-pin terminal T2, and each of the first and the second bin-pin terminals T1, T2 further include two pins. These pins of the first and the second bin-pin terminals T1, T2 are configured to be detachably installed on the traditional fluorescent lamp base for receiving a current therefrom. The filament-simulating unit 10 also includes a first filament-simulating circuit 100 and a second filament-simulating circuit 102 connected to the pins of the first bi-pin terminal T1 and the second bi-pin terminal T2, and therefore, the filament-simulating unit 10 may also be referred to as a filament-simulating circuit 10. The power source module 1 may also be described as a power source circuit, or a power supply circuit.

The first filament-simulating circuit 100 and the second filament-simulating circuit 102 are able to receive current(s) via the bi-pin terminals T1, T2 and power source ends of the fluorescent lamp base from an external power source. During a pre-heat process executed by the ballast of the fluorescent lamp base, a current flows from one pin to the other pin of the first bi-pin terminal T1 via the first filament-simulating circuit 100, and similarly a current from one pin to the other pin of the second bi-pin terminal T2 via the second filament-simulating circuit 102 respectively. The current limiting circuit 12 is electrically connected to the first bi-pin terminals T1, and used for limiting the current from the first bi-pin terminal T1 to be in a suitable range for driving the LED module 2. The rectifier 14 is electrically connected between the current limiting circuit 12 and the second filament-simulating circuit 102. The rectifier 14 is used for rectifying the current from the bi-pin terminals T1, T2. The current inputted from the external power source is an alternating current, and the rectifier 14 rectifies the alternating current to be a direct current. The filter 16 is electrically connected to the rectifier 14 for filtering the rectified current and outputting the filtered current to the LED module 2.

The ballast may execute a pre-heat process to the filaments of the traditional fluorescent lamp for pre-heating the filaments. The filament-simulating unit 10 can simulate a filament of the traditional fluorescent lamp, so as to prevent the ballast from erroneously judging that the filaments are open-circuited or short-circuited during the pre-heating process of the ballast.

Figure 2:
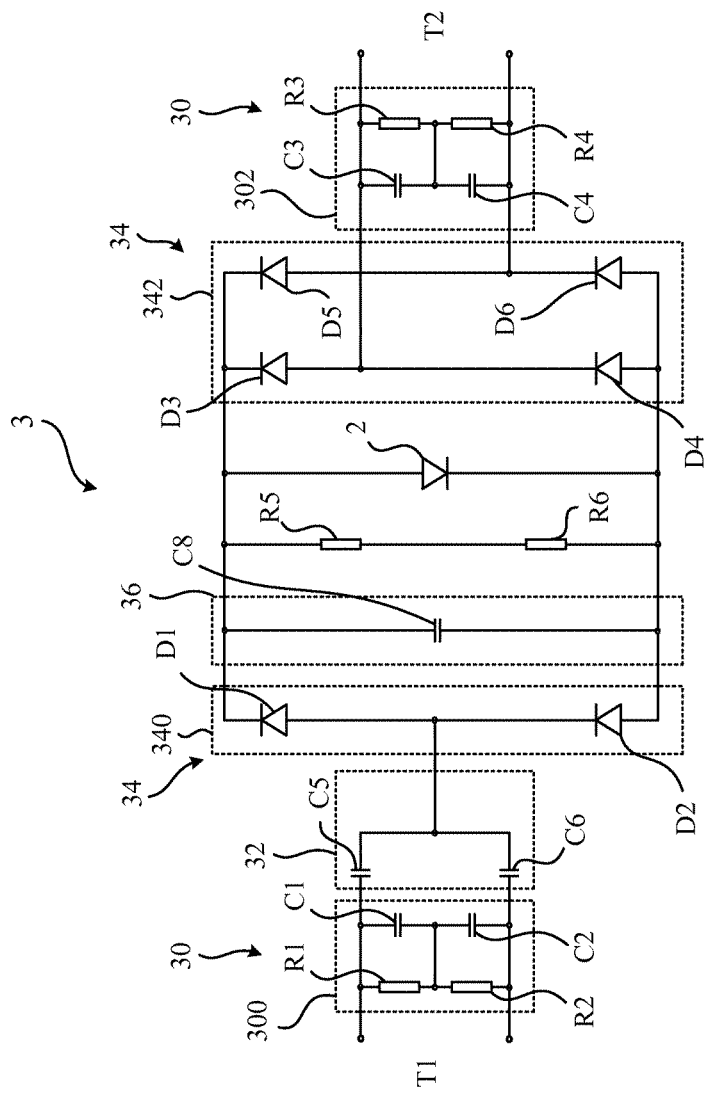
FIG. 2 is a schematic diagram illustrating a power source module for an LED lamp according to another embodiment of the invention.

Please refer to FIG. 2. FIG. 2 is a schematic diagram illustrating a power source module 3 for an LED lamp according to another embodiment of the invention.

As shown in FIG. 2, the power source module 3 includes a filament-simulating unit 30, a current limiting circuit 32, a rectifier 34, and a filter 36 electrically connected between the LED module 2 and two bi-pin terminals T1 and T2. It should be noted that although FIG. 2 only shows one LED of the LED module 2, the LED module 2 may include more than one LED connected in parallel and/or in series in another embodiment. The filament-simulating unit 30 includes a first filament-simulating circuit 300 connected to the first bi-pin terminal T1 and a second filament-simulating circuit 302 connected to the second bi-pin terminal T2.

The first filament-simulating circuit 300 includes a pair of resistors, e.g., resistances R1, R2 and a pair of capacitors, e.g., capacitances C1, C2. The term "capacitance(s)" described herein may also be referred to as "capacitor(s)" and the term "resistance(s)" described herein may also be referred to as "resistor(s)." The resistances R1 and R2 are connected in series, and the capacitances C1 and C2 are connected in series. The pair of resistances and the pair of capacitances are connected in parallel between the pins of the first bi-pin terminal Ti. The connection point between resistances R1, R2 is electrically connected to the connection point between capacitances C1, C2. Thereby, when one of the resistances R1, R2 and the capacitances C1, C2 is open circuited, the first filament-simulating circuit 300 still works.

Similarly, the second filament-simulating circuit 302 includes a pair of resistors, e.g., resistances R3, R4 and a pair of capacitors, e.g., capacitances C3, C4. The connecting relations of R3, R4, T3, T4, and the pins of the second bi-pin terminal T2 are similar to those of the first filament-simulating circuit 300 and the first bi-pin terminal T1, as shown in FIG. 2.

The values of the resistances R1, R2, R3, R4 and the capacitances C1, C2, C3, C4 could be matched in a reasonable range, for example, when the ballast provides a high frequency signal into the power source module 3, the impedance of the first pair of resistances R1, R2 could be ten times more than that of the first pair of capacitances C1, C2, and an impedance of the second pair of resistances R3, R4 could be ten times more than that of the second pair of capacitances. In this embodiment, the value of the resistances could be 100 Ka and the value of the capacitances could be 220 nF. The resistances R1, R2, R3, R4 and the capacitances C1, C2, C3, C4 could be electrically connected to the ballast in the traditional fluorescent lamp base via the first bi-pin terminal T1 and the second bi-pin terminal T2, to simulate the filaments during the pre-heating process of the ballast. After the pre-heating process, the ballast enters a normal operation state, and outputs an alternating current with a high frequency, e.g., 45 KHz, to the current limiting circuit 32.

The current limiting circuit 32 includes at least one capacitor, and in this embodiment, capacitances C5 and C6. The capacitances C5 and C6 may be film capacitances to increase the reliability of the power source module 3. One end of the capacitance C5 is connected to one of the pins of the first bi-pin terminal T1. One end of the capacitance C6 is connected to the other of the pins of the first bi-pin terminal T1. The other ends of the capacitance C5 and the capacitance C6 are connected together, and connected to the rectifier 34. The values of the capacitances C5 and C6 can be matched to limit the value the current in a reasonable range when the ballast provides a high voltage to the LED module 2. The reasonable range is defined to the current range which drives the LED module 2 to operate normally, so that the reasonable range would vary with different types of LED or LED array. In practice, the reasonable range could be under 217 mA. The capacitances C5 and C6 are connected to different pins of the first bi-pin terminal T1, so that the value of the current from any one of the pins is assured to be limited in the reasonable range.

Figure 3:
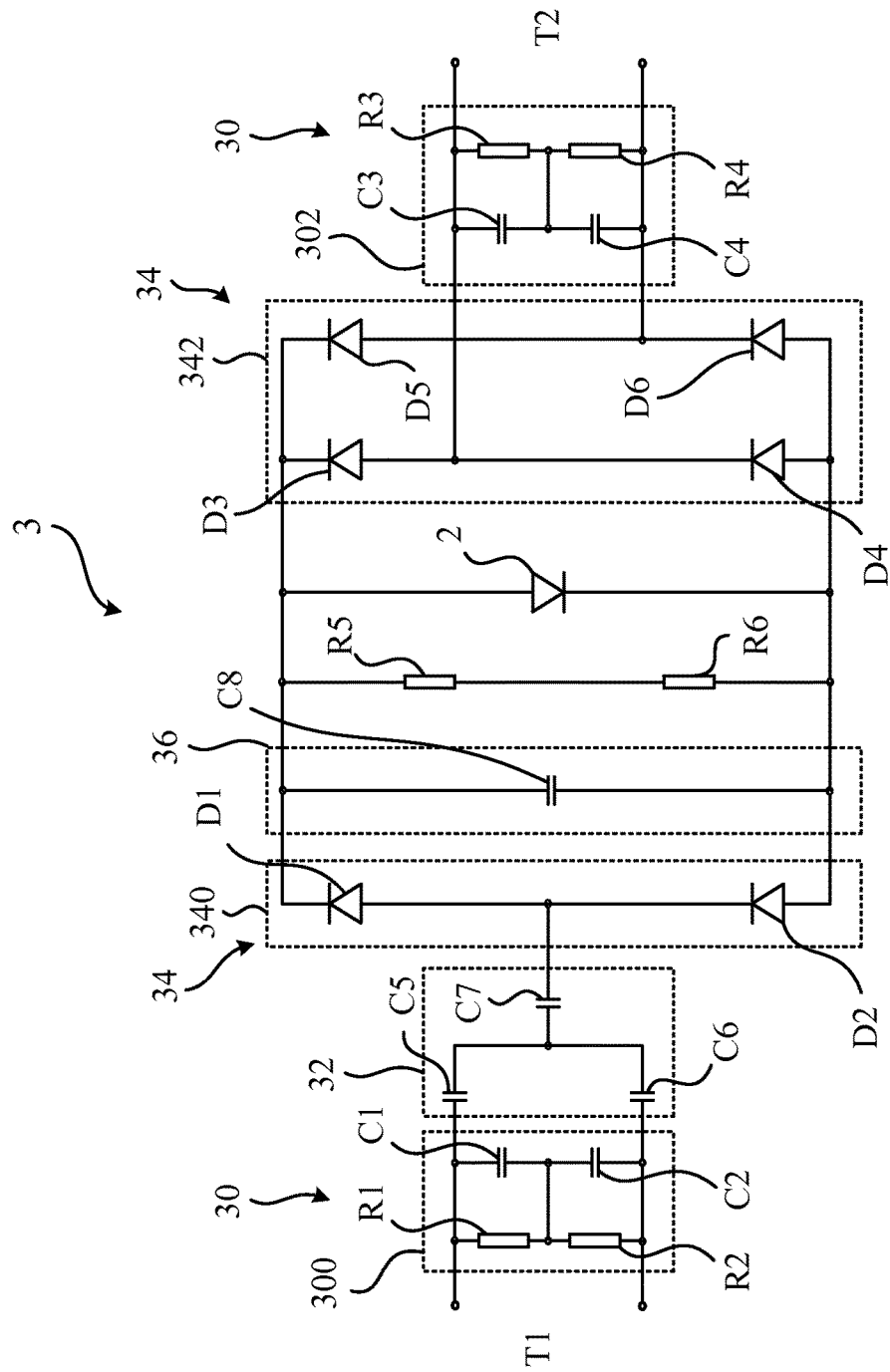
FIG. 3 is a schematic diagram illustrating a power source module for an LED lamp according to another embodiment of the invention.

Please refer to FIG. 3. FIG. 3 is a schematic diagram illustrating a power source module 3 for an LED lamp according to another embodiment of the invention. As shown in FIG. 3, the difference between this embodiment and the last embodiment is that the current limiting circuit 32 further includes the third capacitance C7 connected between the capacitances C5 and C6 and the rectifier 34, so as to ensure the value of the current in the reasonable range even if one of the capacitances C5 and C6 is damaged. In a preferred embodiment, the values of the capacitances C5, C6, C7 are in the range of 0.47 nF to 12 nF, and in this embodiment, the values of the capacitances C5, C6 are 3.3 nF, and the value of the capacitance C7 is 8.2 nF.

The rectifier 34 includes a first rectifier 340 and a second rectifier 342 electrically connected to the current limiting circuit 32 and the second filament-simulating circuit 302 respectively for receiving and rectifying the current from the current limiting circuit 32. Furthermore, the rectifier 34 is connected to the LED module 2 for outputting the rectified current thereto. The rectifier 34 includes six diodes D1, D2, D3, D4, D5, and D6, wherein the first rectifier 340 includes diodes D1, D2 electrically connected in series and the second rectifier 342 includes diodes D3, D4, D5, and D6 electrically connected to each other to form a bridge rectifier. In the embodiment shown in FIG. 2, the first diode D1 has an anode connected to the junction point of the capacitances C5 and C6 and a cathode thereof connected to the anode of the LED module 2. In the embodiment shown in FIG. 3, the first diode D1 has an anode connected to the third capacitance C7 and a cathode thereof connected to the anode of the LED module 2. The second diode D2 has an anode connected to the cathode of the LED module 2 and a cathode thereof connected to the third capacitance C7. A current may flow from the LED module 2 to one pin of the first bi-pin terminal T1 through the diode D2 and the current limiting circuit 32, or from one pin of the first bi-pin terminal T1 to the LED module 2 through the diode D1 and the current limiting circuit 32. The third diode D3 has an anode connecting to one of the pins of the second bi-pin terminal T2 and a cathode connected to the anode of the LED module 2. The fourth diode D4 has an anode connected to the cathode of the LED module 2 and a cathode connected to the anode of the third diode D3. The fifth diode D5 has an anode connected to the other of the pins of the second bi-pin terminal T2 and a cathode connected to the anode of the LED module 2. The sixth diode D6 has an anode connected to the cathode of the LED module 2 and a cathode connected to the anode of the fifth diode D5 which is connected to the other of the pins of the second bi-pin terminal T2.

The diodes of the rectifier 34 make a full-wave rectification to the current limited by the current limiting circuit 32, to output a rectified, direct current with a double frequency. For example, the current from the current limiting circuit 32 was an alternating current with frequency of 45 KHz, and the rectified current output by the rectifier 34 is a direct current with frequency of 90 KHz. The rating current/voltage values of the diodes of the rectifier 34 are 1 A/1000V, in this embodiment.

The filter 36 includes a filtering capacitance C8 connected to the rectifier 34 and the LED module 2 in parallel, as shown in FIGS. 2 and 3. The filtering capacitance C8 is used for storing energy from the rectifier 34 to filter and smooth the rectified current from the rectifier 34, and then outputting the filtered current to drive the LED module 2. The value of the filtering capacitance C8 is 680 nF, in this embodiment.

In this embodiment, the power source module 3 further includes a pair of discharging resistances R5 and R6 connected in series. The discharging resistance pair is connected to the filter 36 and the LED module 2 in parallel. The discharging resistances R5 and R6 can discharge the energy stored in the filtering capacitance C8 rapidly to prevent the LED lamp from flicker when turning off the power inputted to the power source module.

As described above, the power source module for the LED lamp simulates the filaments to prevent the ballast from stopping supplying power due to the error judgement during the pre-heating process. The current provided by the external power source after the pre-heating process can be limited, rectified, and filtered by the power source module to a suitable direct current to drive the LED, and the energy can be discharge rapidly after turning power off. Therefore, the power source module enables the LED lamp installed on the traditional fluorescent lamp base to operate normally without modifying the circuit in the base.

Although the present invention has been illustrated and described with reference to the preferred embodiment thereof, it should be understood that it is in no way limited to the details of such embodiment but is capable of numerous modifications within the scope of the appended claims.

We claim:

1. A power source module for an LED lamp, comprising:
   a filament-simulating circuit electrically connected to a first bi-pin terminal and a second bi-pin terminal of the LED lamp, each of the first bi-pin terminal and the second bi-pin terminal configured to allow a current to flow from one pin to the other pin via the filament-simulating circuit during a pre-heat process executed by a ballast;
   a current limiting circuit electrically connected to the filament-simulating circuit and configured to limit a current from the filament-simulating circuit;
   a first rectifier electrically connected to the current limiting circuit and configured to rectify the current from the current limiting circuit; and
   a filter electrically connected between the first rectifier and at least one LED of the LED lamp and configured to smooth the current from the first rectifier.

2. The power source module of claim 1, wherein the filament-simulating circuit comprises:
   a first filament-simulating circuit comprising a first capacitor element electrically connected between two pins of the first bi-pin terminal; and
   a second filament-simulating circuit comprising a second capacitor element electrically connected between two pins of the second bi-pin terminal.

3. The power source module of claim 2, wherein:
   the first filament-simulating circuit further comprises a first pair of resistors electrically connected in series, the first capacitor element comprises a first pair of capacitors electrically connected in series, the first pair of resistors and the first pair of capacitors electrically connected in parallel between two pins of the first bi-pin terminal, and a connection point between the first pair of resistors being electrically connected to a connection point between the first pair of capacitors; and
   the second filament-simulating circuit further comprises a second pair of resistors electrically connected in series, the second capacitor element comprises a second pair of capacitors electrically connected in series, the second pair of resistors and the second pair of capacitors electrically connected in parallel between two pins of the second bi-pin terminal, and a connection point between the second pair of resistors being electrically connected to a connection point between the second pair of capacitors.

4. The power source module of claim 3, wherein an impedance of the first pair of resistors is ten times more than that of the first pair of capacitors, and an impedance of the second pair of resistors is ten times more than that of the second pair of capacitors.

5. The power source module of claim 2, wherein the first rectifier comprises two diodes electrically connected in series, and the first rectifier is electrically connected to the first filament-simulating circuit in series.

6. The power source module of claim 2, wherein the first rectifier comprises two diodes electrically connected in series and a connection node connecting the two diodes is coupled to the current limiting circuit, wherein a current flows from the at least one LED to one pin of the first bi-pin terminal through one of the two diodes and the current limiting circuit, or from one pin of the first bi-pin terminal to the at least one LED through the other of the two diodes and the current limiting circuit.

7. The power source module of claim 6, wherein the current limiting circuit comprises at least a capacitor.

8. The power source module of claim 5, further comprising a second rectifier, wherein the second rectifier is a bridge rectifier electrically connected to the second filament-simulating circuit in parallel.

9. The power source module of claim 1, wherein the power source module is configured inside a casing of the LED lamp.

10. The power source module of claim 1, further comprising a discharging circuit electrically connected to the filter in parallel for discharging the filter.

11. The power source module of claim 1, wherein the current limiting circuit comprises:
a first capacitor, one end of the first capacitor being electrically connected to one pin of the first bi-pin terminal; and
a second capacitor, one end of the second capacitor being electrically connected to the other pin of the first bi-pin terminal, and the other end of the second capacitor being electrically connected to the other end of the first capacitor and the first rectifier.

12. The power source module of claim 11, wherein the current limiting circuit further comprises:
a third capacitor, one end of the third capacitor being electrically connected to the other ends of the first capacitor and the second capacitor, and the other end of the third capacitor being electrically connected to the first rectifier.

13. The power source module of claim 11, wherein the first rectifier comprises two diodes electrically connected in series and the connection node of the two diodes is electrically connected to the other ends of the first and second capacitor.

14. The power source module of claim 11, further comprising a discharging circuit electrically connected to the filter in parallel for discharging the filter.

15. The power source module of claim 1, wherein the filter comprises a filtering capacitor electrically connected to the at least one LED.

16. The power source module of claim 1, further comprising a discharging circuit electrically connected to the filter in parallel for discharging the filter.

17. A power source module for an LED lamp, comprising:
a rectifier electrically connected to terminals of the LED lamp and configured to receive a current;
a filter electrically connected between the rectifier and at least one LED of the LED lamp and configured to store energy from the rectifier and to smooth the current from the rectifier;
a discharging circuit electrically connected to the filter in parallel and configured to discharge the energy stored in the filter; and
a filament-simulating circuit electrically connected to a first bi-pin terminal and a second bi-pin terminal of the LED lamp, the filament-simulating circuit comprising at least one resistor connected in parallel to at least one capacitor and configured to simulate a filament of a fluorescent lamp during a pre-heat process executed by a ballast.

18. The power source module of claim 17, further comprising a current limiting circuit electrically connected to the first bi-pin terminal of the LED lamp, and configured to limit a current from the first bi-pin terminal.

19. The power source module of claim 18, wherein the current limiting circuit comprises:
a first capacitor, one end of the first capacitor being electrically connected to one pin of the first bi-pin terminal; and
a second capacitor, one end of the second capacitor being electrically connected to the other pin of the first bi-pin terminal, and the other end of the second capacitor being electrically connected to the other end of the first capacitor and the rectifier.

20. The power source module of claim 19, wherein the current limiting circuit further comprises:
a third capacitor, one end of the third capacitor being electrically connected to the other ends of the first capacitor and the second capacitor, and the other end of the third capacitor being electrically connected to the rectifier.

21. A power source module for an LED lamp, comprising:
a first circuit comprising a first capacitor element electrically connected between two pins of a first bi-pin terminal of the LED lamp, and a second circuit comprising a second capacitor element electrically connected between two pins of a second bi-pin terminal, wherein the first and second circuits are configured to simulate a filament of a fluorescent lamp during a pre-heat process executed by a ballast;
a current limiting circuit electrically connected to the first bi-pin terminal and configured to limit a current from the first bi-pin terminal;
a rectifier electrically connected between the current limiting circuit and the second circuit and configured to rectify the current from the current limiting circuit and a current from the second bi-pin terminal; and
a filter electrically connected between the rectifier and at least one LED of the LED lamp to store energy from the rectifier and configured to smooth the current from the rectifier.

22. The power source module of claim 21, wherein:
the first circuit further comprises a first pair of resistors electrically connected in series, the first capacitor element comprises a first pair of capacitors electrically connected in series, the first pair of resistors and the first pair of capacitors electrically connected in parallel between two pins of the first bi-pin terminal, and a connection point between the first pair of resistors being electrically connected to a connection point between the first pair of capacitors; and the second circuit further comprises a second pair of resistors electrically connected in series, the second capacitor element comprises a second pair of capacitors electrically connected in series, the second pair of resistors and the second pair of capacitors electrically connected in parallel between two pins of the second bi-pin terminal, and a connection point between the second pair of resistors being electrically connected to a connection point between the second pair of capacitors.

23. An LED lamp, comprising:

a current limiting circuit electrically connected to a first terminal of the LED lamp for limiting a current from the first terminal;

a first rectifier electrically connected to the current limiting circuit for rectifying the current from the current limiting circuit;

a filter electrically connected between the first rectifier and at least one LED of the LED lamp for smoothing the current from the first rectifier; and a filament-simulating circuit electrically connected to a first bi-pin terminal and a second bi-pin terminal of the LED lamp, each of the first and the second bi-pin terminals having a current flowing from one pin to the other pin of the respective bi-pin terminal via the filament-simulating circuit during a pre-heat process executed by a ballast.

24. The LED lamp of claim 23, wherein the filament-simulating circuit comprises:

a first filament-simulating circuit comprising a first capacitor element electrically connected between two pins of the first bi-pin terminal; and a second filament-simulating circuit comprising a second capacitor element electrically connected between two pins of the second bi-pin terminal.

25. The LED lamp of claim 24, wherein:

the first filament-simulating circuit further comprises a first pair of resistors electrically connected in series, the first capacitor element comprises a first pair of capacitors electrically connected in series, the first pair of resistors and the first pair of capacitors electrically connected in parallel between two pins of the first bi-pin terminal, and a connection point between the first pair of resistors being electrically connected to a connection point between the first pair of capacitors; and the second filament-simulating circuit further comprises a second pair of resistors electrically connected in series, the second capacitor element comprises a second pair of capacitors electrically connected in series, the second pair of resistors and the second pair of capacitors electrically connected in parallel between two pins of the second bi-pin terminal, and a connection point between the second pair of resistors being electrically connected to a connection point between the second pair of capacitors.

26. The LED lamp of claim 23, wherein the current limiting circuit comprises:

a first capacitor, one end of the first capacitor being electrically connected to one pin of the first terminal; and a second capacitor, one end of the second capacitor being electrically connected to the other pin of the first terminal, and the other end of the second capacitor being electrically connected to the other end of the first capacitor and the first rectifier.

27. The LED lamp of claim 26, wherein the current limiting circuit further comprises:

a third capacitor, one end of the third capacitor being electrically connected to the other ends of the first capacitor and the second capacitor, and the other end of the third capacitor being electrically connected to the first rectifier.

28. The LED lamp of claim 26, wherein the first rectifier comprises two diodes electrically connected in series and the connection node of the two diodes is electrically connected to the other ends of the first and second capacitor.

29. The LED lamp of claim 23, further comprising a discharging circuit electrically connected to the filter in parallel for discharging the filter.

30. The LED lamp of claim 24, wherein the first rectifier comprises two diodes electrically connected in series, and the first rectifier is electrically connected to the first filament-simulating circuit in parallel.

31. The power source module of claim 1, wherein the current limiting circuit comprises at least a capacitor.

32. The power source module of claim 1, wherein:

the filament-simulating circuit comprises a first filament-simulating circuit connected between two pins of the first bi-pin terminal, and a second filament-simulating circuit connected between two pins of the second bi-pin terminal; and the current limiting circuit comprises at least a capacitor connected to the first filament-simulating circuit, and at least a capacitor connected to the second filament-simulating circuit.

33. The power source module of claim 1, wherein:

the LED lamp comprises an LED module comprising the at least one LED;

the filament-simulating circuit comprises a first filament-simulating circuit comprising an impedance element electrically connected between two pins of the first bi-pin terminal, and a second filament-simulating circuit comprising an impedance element electrically connected between two pins of the second bi-pin terminal; and the power source module further comprises a second rectifier coupled between the second filament-simulating circuit and the LED module, wherein the second rectifier is electrically connected to the second filament-simulating circuit in parallel and is electrically connected to the LED module in parallel.

34. The power source module of claim 17, further comprising a current limiting circuit electrically connected to the second bi-pin terminal of the LED lamp, and configured to limit a current from the second bi-pin terminal.

35. The power source module of claim 17, wherein the filament-simulating circuit comprises a first filament-simulating circuit connected between two pins of the first bi-pin terminal, and a second filament-simulating circuit connected between two pins of the second bi-pin terminal.

36. The power source module of claim 21, further comprising another current limiting circuit electrically connected to the second bi-pin terminal of the LED lamp, configured to limit a current from the second bi-pin terminal.

37. The LED lamp of claim 23, further comprising another current limiting circuit electrically connected to a second terminal of the LED lamp, configured to limit a current from the second terminal.

38. The LED lamp of claim 23, wherein the current limiting circuit comprises at least a capacitor.

39. The LED lamp of claim 23, wherein the filament-simulating circuit comprises a first filament-simulating circuit connected between a first pin and a second pin pin of the first bi-pin terminal, and a second filament-simulating circuit connected between a first pin and a second pin of the second bi-pin terminal.

40. The LED lamp of claim 23, furthering comprising:
an LED module comprising the at least one LED, wherein the filament-simulating circuit comprises a first filament-simulating circuit comprising an impedance element electrically connected between two pins of the first bi-pin terminal, and a second filament-simulating circuit comprising an impedance element electrically connected between two pins of the second bi-pin terminal; and
a second rectifier coupled between the second filament-simulating circuit and the LED module, wherein the second rectifier is electrically connected to the second filament-simulating circuit in parallel and is electrically connected to the LED module in parallel.

41. An LED lamp, comprising:
a current limiting circuit electrically connected to a first terminal of the LED lamp for limiting a current from the first terminal;
a first rectifier electrically connected to the current limiting circuit for rectifying the current from the current limiting circuit;
a filter electrically connected between the first rectifier and at least one LED of the LED lamp for smoothing the current from the first rectifier; and
a first filament-simulating circuit electrically connected to a first bi-pin terminal of the LED lamp and a second filament-simulating circuit electrically connected to a second bi-pin terminal of the LED lamp, each of the first and the second bi-pin terminals arranged to have a current flowing from one pin to the other pin of the respective bi-pin terminal via the respective first or second filament-simulating circuit during a pre-heat process executed by a ballast.

42. An LED lamp, comprising:
a current limiting circuit electrically connected to a first terminal of the LED lamp for limiting a current from the first terminal;
a first rectifier electrically connected to the current limiting circuit for rectifying the current from the current limiting circuit;
a filter electrically connected between the first rectifier and at least one LED of the LED lamp for smoothing the current from the first rectifier; and
a first filament-simulating circuit electrically connected to a first bi-pin terminal of the LED lamp, and a second filament-simulating circuit electrically connected to a second bi-pin terminal of the LED lamp, each of the first and the second bi-pin terminals arranged to have a current flowing from one pin to the other pin of the respective bi-pin terminal via the respective first or second filament-simulating circuit after the LED lamp is connected to a ballast and before a normal operation state of the LED lamp.

43. The LED lamp of claim 42, further comprising:
an LED module comprising the at least one LED, wherein the first filament-simulating circuit comprises an impedance element electrically connected between two pins of the first bi-pin terminal, and the second filament-simulating circuit comprises an impedance element electrically connected between two pins of the second bi-pin terminal; and
a second rectifier coupled between the second filament-simulating circuit and the LED module, wherein the second rectifier is electrically connected to the second filament-simulating circuit in parallel and is electrically connected to the LED module in parallel.

* * * * *